United States Patent
Muller et al.

(10) Patent No.: US 9,626,661 B2
(45) Date of Patent: Apr. 18, 2017

(54) E-MEETING REQUIREMENT ASSURANCE FOR E-MEETING MANAGEMENT

(75) Inventors: Michael Muller, Cambridge, MA (US); Amy D. Travis, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1747 days.

(21) Appl. No.: 12/828,263

(22) Filed: Jun. 30, 2010

(65) Prior Publication Data

US 2012/0005278 A1    Jan. 5, 2012

(51) Int. Cl.
*G06F 15/16*    (2006.01)
*G06Q 10/10*    (2012.01)

(52) U.S. Cl.
CPC ............................... *G06Q 10/1095* (2013.01)

(58) Field of Classification Search
CPC .................................................. G06Q 10/1095
USPC .......................... 709/200, 204, 206; 705/500
See application file for complete search history.

(56) References Cited

U.S. PATENT DOCUMENTS

| | | | | |
|---|---|---|---|---|
| 6,625,643 B1 * | 9/2003 | Colby et al. | .................. | 709/217 |
| 2006/0256738 A1 * | 11/2006 | Kenoyer et al. | .............. | 370/260 |
| 2011/0264745 A1 * | 10/2011 | Ferlitsch | ....................... | 709/205 |

* cited by examiner

*Primary Examiner* — El Hadji Sall
(74) *Attorney, Agent, or Firm* — Steven M. Greenberg, Esq.; CRGO Law

(57) ABSTRACT

Embodiments of the present invention provide a system and computer program product for e-meeting requirements assurance in e-meeting management. In an embodiment of the invention, a computer program product for e-meeting requirements assurance in e-meeting management is provided. The computer program product includes selecting a scheduled e-meeting for an invitee in memory of a computer, retrieving resource requirements published for the selected scheduled e-meeting, inspecting local computing resources of the invitee, comparing the local computing resources to the retrieved resource requirements to identify local resource deficiencies, and generating a notice of the local resource deficiencies to the invitee prior to a scheduled date and time for the e-meeting.

7 Claims, 1 Drawing Sheet

E-MEETING REQUIREMENT ASSURANCE FOR E-MEETING MANAGEMENT

BACKGROUND OF THE INVENTION

Field of the Invention

The present invention relates to the field of collaborative computing and more particularly to scheduling e-meetings in a collaborative computing environment.

Description of the Related Art

Individuals worldwide can converge over a communications network to share ideas, documents, sound and images without needing to be in the same room. Technology facilitates this through multipoint audio conferencing, video conferencing over traditional networks, and many forms of conferencing over the Internet. A substantial collection of technologies and protocols has been assembled to effectively deliver audio, video, and data over the single digital communications medium of the Internet.

An e-meeting represents one popular form of electronic collaboration. In an e-meeting, participants can view a common space, for instance a whiteboard or a shared application (or both), through which ideas can be exchanged. The viewing of the common space can be complemented with a teleconference, a videoconference, an instant messaging session, or any combination thereof, such that the meeting can act as a near substitute for an in-person meeting in a conference room.

Collaborators who participate in e-meetings often maintain a personal schedule managed by a scheduling system. Collaborators can schedule e-meetings within the personal schedule sua sponte, or the collaborators can schedule e-meetings responsive to the receipt of an invitation. An invitation typically contains data regarding the e-meeting such as a topic, list of invitees, and most importantly, a date, time and online location for the e-meeting. Using this data, the invitee can be prompted either to accept or decline the invitation. Oftentimes, the acceptance or declination of an invitation can be accomplished with a single user action such as a mouse click.

Once an e-meeting has been scheduled and the selected participants notified, prior to the scheduled occurrence of the e-meeting one or more e-meeting confirmations can be issued to the selected participants who have accepted the originally issued invitation. Traditionally, an e-meeting confirmation is an e-mail reminder provided by the e-meeting organizer and transmitted manually to the selected participants. Of course, the successful transmission of an e-meeting confirmation depends entirely upon the e-meeting organizer remembering to draft and send the e-meeting confirmation.

Different e-meetings can have different resource requirements. Basic e-meetings require nothing more than a basic Web browser of any form in a simple computing device enjoying network access to the e-meeting server. More advanced e-meetings may involve the processing of imagery or data necessitating minimum processor power in the computing device, minimum bandwidth with respect to connectivity, or a minimum display capability including a particular browser type. The most sophisticated of e-meetings can require audio-visual support including a web cam and a microphone to capture both audio and video of the participant to the e-meeting.

Generally, at the time of distributing invites to an e-meeting, little notice is provided in connection with the resource requirements of the computing infrastructure of the invitee. While some resource requirements can be inferred from the invite itself, it remains incumbent upon the recipient of the invite to confirm the availability of the requisite resources to properly participate in the e-meeting. Alas, it remains common that substantial time and effort is wasted at the outset of an e-meeting while participants scramble to determine whether or not the requisite resources to conduct the e-meeting are available to all participants.

BRIEF SUMMARY OF THE INVENTION

Embodiments of the present invention address deficiencies of the art in respect to e-meeting management and provide a novel and non-obvious method, system and computer program product for e-meeting requirements assurance in e-meeting management. In an embodiment of the invention, a method for e-meeting requirements assurance in e-meeting management is provided. The method includes selecting a scheduled e-meeting for an invitee in memory of a computer, retrieving resource requirements published for the selected scheduled e-meeting, inspecting local computing resources of the invitee, comparing the local computing resources to the retrieved resource requirements to identify local resource deficiencies, and generating a notice of the local resource deficiencies to the invitee prior to a scheduled date and time for the e-meeting.

In another embodiment of the invention, an e-meeting data processing system can be configured for e-meeting requirements assurance in e-meeting management. The system includes a computer with at least one processor and memory and configured for communicative coupling to an e-meeting server over a computer communications network. The system also includes a resource assurance module executing in the memory of the computer. The module includes program code enabled to select a scheduled e-meeting for an invitee, to retrieve resource requirements published for the selected scheduled e-meeting, to inspect local computing resources of the computer, to compare the local computing resources to the retrieved resource requirements to identify local resource deficiencies, and to generate a notice of the local resource deficiencies to the invitee prior to a scheduled date and time for the e-meeting.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for e-meeting requirements assurance in e-meeting management. In accordance with an embodiment of the invention, an e-meeting can be scheduled with an invite broadcast to different invitees to the e-meeting. A set of resource requirements for the e-meeting further can be published to calendar entries for respective ones of the invitees accepting the invite. Subsequent to the acceptance of the invite by an invitee, the resource requirements can be compared to available resources in a computing device of the invitee. Responsive to detecting a resource deficiency relative to the resource requirements, a notice can be generated to the invitee of the resource deficiency. In this way, a lack of necessary resources for the e-meeting by an invitee can be addressed in advance of the e-meeting rather than during the e-meeting.

Figure 1:
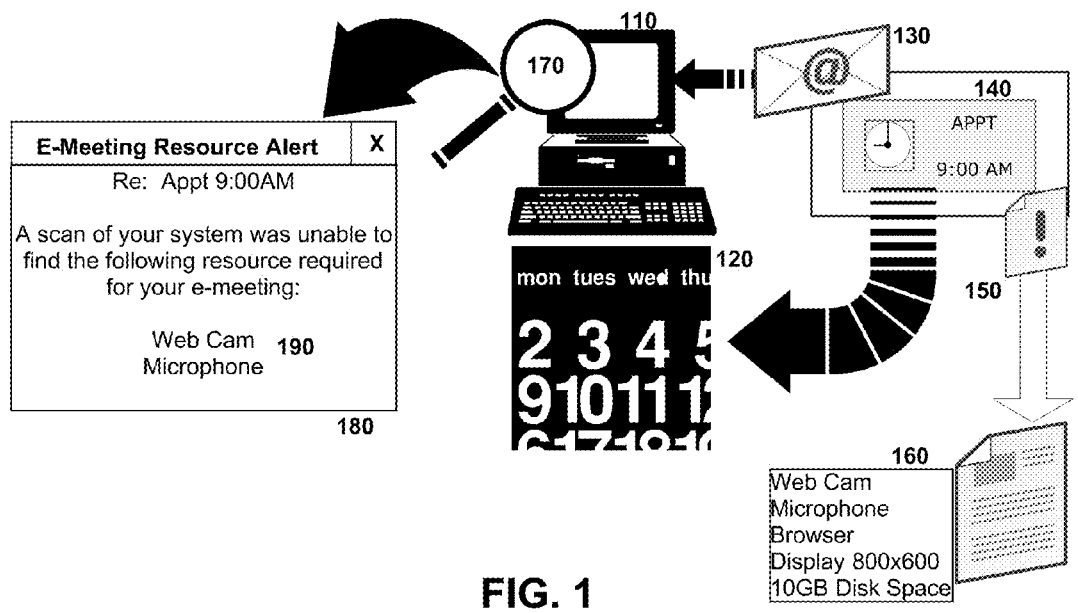
FIG. 1 is a pictorial illustration of a process for e-meeting requirements assurance in e-meeting management.

In further illustration, FIG. 1 is a pictorial illustration of a process for e-meeting requirements assurance in e-meeting management. As shown in FIG. 1, an invite 130 can be received for an e-meeting 140 in a computer 110, for example, by way of electronic mail. The invite 130 can include a requirements reference 150 to requirements document 160 of required resources for the invitee. The e-meeting 140 can be scheduled in calendar 120 of the computer 110. Thereafter, before the scheduled date and time of the e-meeting 140, a requirements reference 150 can be extracted from an e-meeting 140 and the resources of the computer 110 can be inspected by resource inspector 170 and compared to those of the requirements document 160 referenced by the requirements reference 150. To the extent a deficiency can be identified, notice 180 can be provided in the computer 110 including a listing 190 of deficiencies identified.

In this regard, the requirements document 160 can require the presence of audiovisual resources like a microphone or camera. Further, the requirements document 160 can require the use of a particular Web browser or a particular revision level of a particular Web browser. Yet further, the requirements document 160 can require a certain amount of available memory, disk storage space or video display capability. Even yet further, the requirements document 160 can require the presence of supporting computer programs. Regardless, the comparison of the requirements document 160 can occur at any time subsequent to the receipt of the invite 130 and prior to the scheduled time of the e-meeting 140. In one aspect of the embodiment, the comparison can occur at a fixed time prior to the scheduled date and time of the e-meeting 140.

Figure 2:
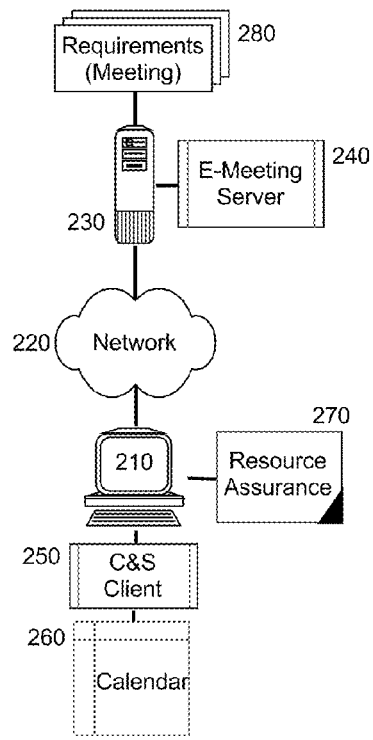
FIG. 2 is a schematic illustration of an e-meeting data processing system configured for e-meeting requirements assurance in e-meeting management; and, FIG. 3 is a flow chart illustrating a process for e-meeting requirements assurance in e-meeting management.

The process described in connection with FIG. 1 can be implemented in an e-meeting data processing system. In this regard, FIG. 2 is a schematic illustration of an e-meeting data processing system configured for e-meeting requirements assurance in e-meeting management. The system can include a computer 210 with at least one processor and memory configured for communicative coupling to a host server 230 over computer communications network 220. The host server 230 can support the operation of an e-meeting server 240 scheduling different e-meetings for different invitees at different dates and time, each of the e-meetings having associated therewith a requirements document 280 of resource requirements for a corresponding e-meeting.

A calendaring and scheduling client 250 can reside in the computer 210 and can provide calendaring and scheduling services to an end user including maintaining a calendar 260 of scheduled meetings and tasks. Of note, resource assurance module 270 can be coupled to the calendaring and scheduling client 250 by way of computer 210. The resource assurance module 270 can include program code that when executed by the processor or processors of the computer 210 is enabled to compare a requirements document 280 for a scheduled e-meeting to the available resources of the computer 210 to identify deficiencies. The program code of the resource assurance module 270 further can be enabled to display notice through the computer 210 of the deficiencies in advance of the date and time of the scheduled e-meeting. For instance, the notification can be in the form of an e-mail notice to the invitee as shown in FIG. 1.

Alternatively, the e-mail notice can be sent to the e-meeting organizer in addition to the invitee or alone to the e-meeting organizer, to name only a few possibilities. In one aspect of the embodiment, upon receipt of a notice of deficient resources for an e-meeting, the invitee can be prompted to forward a request to a help desk to address the deficiencies. The request can be tracked such that upon fulfillment of the request, a notice can be sent to the e-meeting organizer and the invitee of the remediation of the deficiency.

Figure 3:
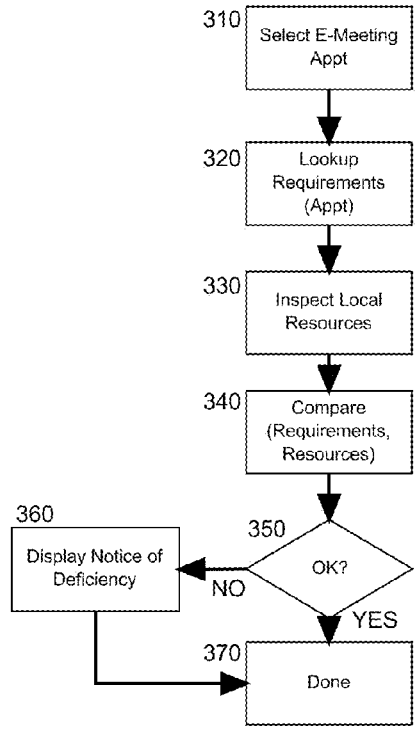

In yet further illustration of the operation of the resource assurance module 270, FIG. 3 is a flow chart illustrating a process for e-meeting requirements assurance in e-meeting management. Beginning in block 310, an e-meeting appointment can be selected for analysis. In this regard, the e-meeting appointment can be selected once a corresponding invite has been accepted by the invitee, or subsequently thereto during a periodic review of all scheduled e-meetings in a calendar of the invitee. In the latter circumstance, the calendar of the invitee can be inspected periodically and all e-meetings within a threshold period of time prior to a corresponding scheduled data and time can be selected for resource assurance.

In block 320, the resource requirements of the selected e-meeting can be determined, for example by reference to a remotely disposed resource document referenced within the scheduled e-meeting. In other words, a reference to a remote resource requirements document can be extracted from the scheduled e-meeting. In block 330, the local resources of the invitee can be inspected and compared in block 340 to the resource requirements of the requirements document. In decision block 350, if all resource requirements have been met, the process can end in block 370. Otherwise, in block 370 notice can be provided to the invitee of the identified deficiencies.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. An e-meeting data processing system configured for e-meeting requirements assurance in e-meeting management, the system comprising:

a computer with at least one processor and memory and configured for communicative coupling to an e-meeting server over a computer communications network; and, a resource assurance module executing in the memory of the computer, the module comprising program code enabled to select a scheduled e-meeting for an invitee, to retrieve resource requirements published in a document for the selected scheduled e-meeting, the document indicating required resource requirements for the selected scheduled e-meeting, the required resource requirements including at least one of a particular Web browser, a particular revision of the particular Web browser, and a pre-installed computer program, to inspect local computing resources of the computer, to compare the local computing resources to the retrieved resource requirements to identify local resource deficiencies, and to generate a notice of the local resource deficiencies to the invitee prior to a scheduled date and time for the e-meeting.

2. A computer program product for e-meeting requirements assurance in e-meeting management, the computer program product comprising:

a computer readable storage medium having computer readable program code embodied therewith, the computer readable program code comprising:

computer readable program code for selecting a scheduled e-meeting for an invitee;

computer readable program code for retrieving resource requirements published in a document for the selected scheduled e-meeting, the document indicating required resource requirements for the selected scheduled e-meeting, the required resource requirements including at least one of a particular Web browser, a particular revision of the particular Web browser, and a pre-installed computer program;

computer readable program code for inspecting local computing resources of the invitee;

computer readable program code for comparing the local computing resources to the retrieved resource requirements to identify local resource deficiencies; and, computer readable program code for generating a notice of the local resource deficiencies to the invitee prior to a scheduled date and time for the e-meeting.

3. The computer program product of claim 2, wherein the computer readable program code for selecting the scheduled e-meeting for the invitee, comprises computer readable program code for identifying an e-meeting scheduled in a calendar to occur within a threshold period of time.

4. The computer program product of claim 2, wherein the computer readable program code for retrieving resource requirements published for the selected scheduled e-meeting, comprises:

computer readable program code for extracting a reference to a remote resource requirements document from the scheduled e-meeting; and, computer readable program code for retrieving resource requirements from the referenced remote resource requirements document.

5. The computer program product of claim 2, wherein the document further comprises local hardware requirements selected from the group consisting of a video camera, a microphone, a minimum amount of memory, a minimum amount of available data storage, and a minimum display capability.

6. The computer program product of claim 2, wherein the computer readable program code for generating the notice of the local resource deficiencies to the invitee prior to the scheduled date and time for the e-meeting, comprises computer readable program code for sending an e-mail to the invitee referencing the deficiencies.

7. The computer program product of claim 2, wherein the computer readable program code for generating the notice of the local resource deficiencies to the invitee prior to the scheduled date and time for the e-meeting, comprises computer readable program code for sending an e-mail to an organizer of the e-meeting referencing the deficiencies.

* * * * *